Sept. 11, 1951 G. M. FREEMAN 2,567,512
FLIGHT HOUR INDICATOR
Filed May 3, 1946 2 Sheets-Sheet 1
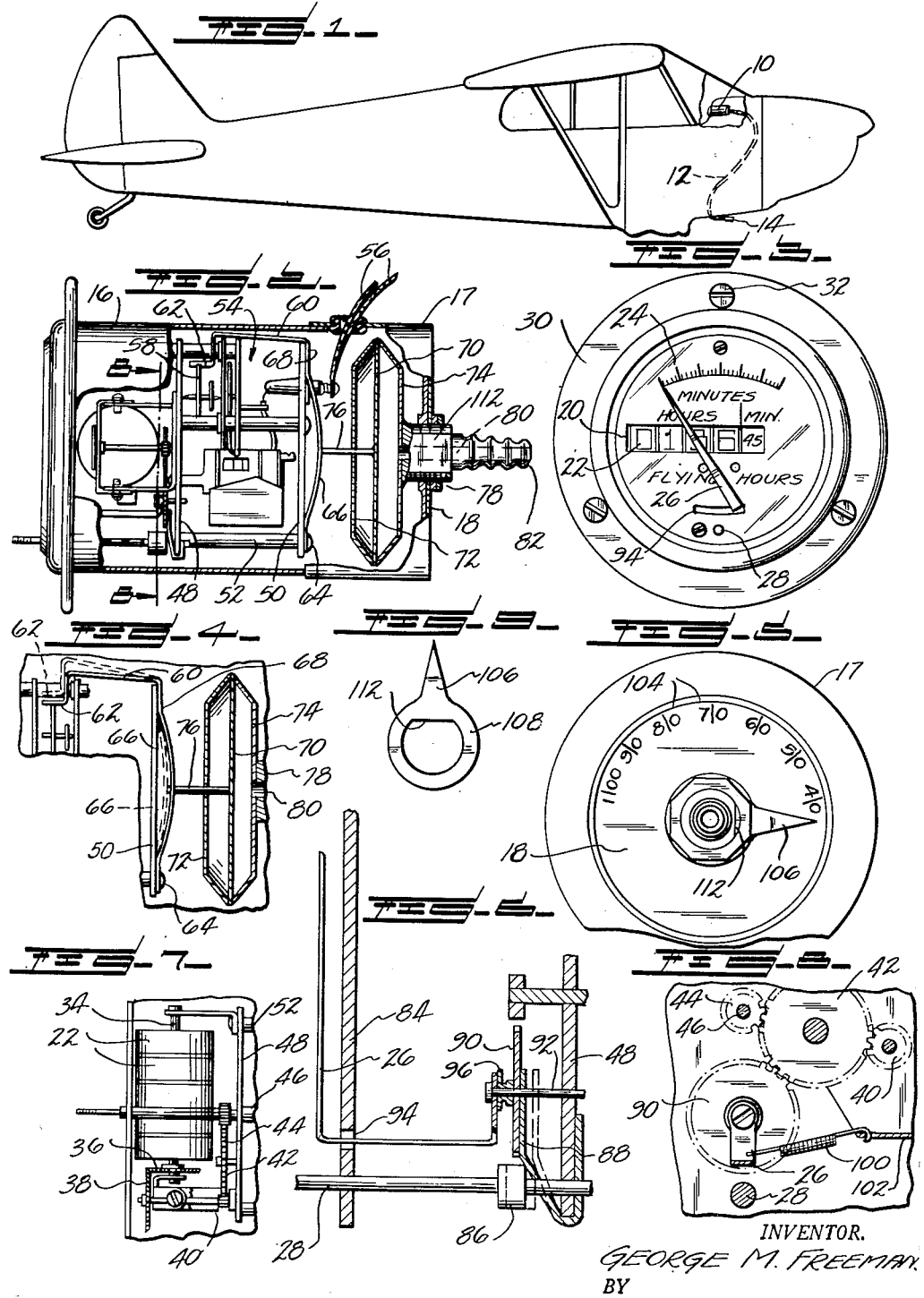
INVENTOR.
GEORGE M. FREEMAN.
BY
Parker and Burton
ATTORNEYS.

Sept. 11, 1951 G. M. FREEMAN 2,567,512
FLIGHT HOUR INDICATOR
Filed May 3, 1946 2 Sheets-Sheet 2
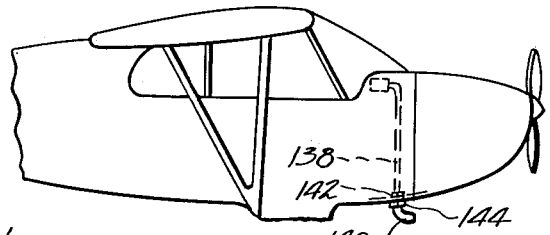
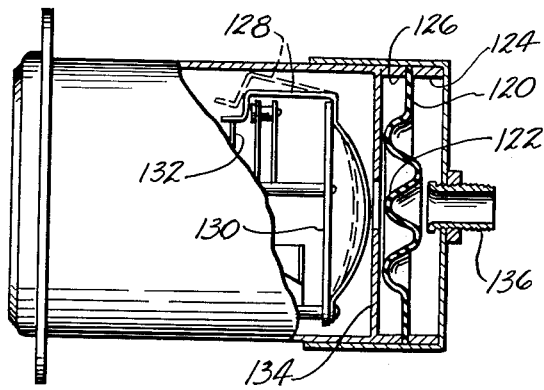
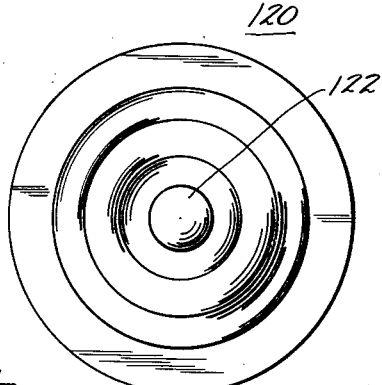
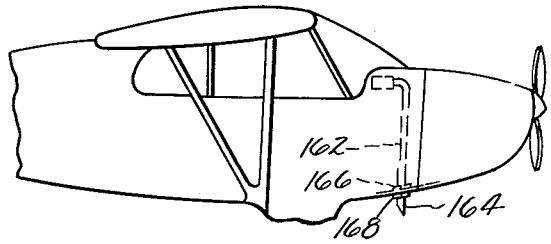
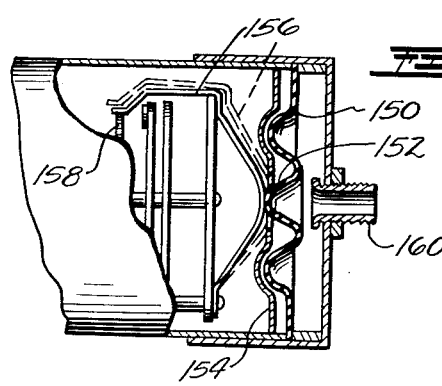
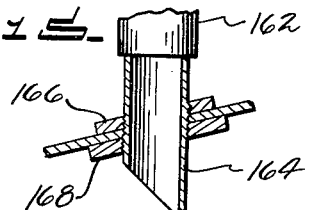
INVENTOR.
GEORGE M. FREEMAN
BY
Parker and Burton
ATTORNEYS.

Patented Sept. 11, 1951

2,567,512

UNITED STATES PATENT OFFICE 2,567,512

FLIGHT HOUR INDICATOR

George M. Freeman, Waukesha, Wis.

Application May 3, 1946, Serial No. 666,975

6 Claims. (Cl. 161—15)

This invention relates to indicating means for aircraft and more particularly to an instrument for indicating accumulatively the flight time of an aircraft.

An important object of this invention is to provide a novel instrument or meter for automatically and accurately indicating the total number of hours and minutes an aircraft has flown and also for indicating the elapse of time of the last made flight of the aircraft. Another important object of the invention is to provide a novel instrument for indicating flight time of an aircraft which only registers the actual hours and minutes of the aircraft in the air and which is automatically rendered inoperative when the aircraft is on the ground. A further object of the invention is to provide a device of this character which is small, compact, light weight and constructed ruggedly to withstand shock and vibration.

More specifically, it is an important object of this invention to provide an accurate indicating device of this character which includes the novel provision of a register for indicating on a dial the accumulated flying hours and minutes in plain figures. Another object of the invention is to provide a novel mechanism for driving the register including a novel braking means for stopping the operation of the mechanism. A further object of the invention is to provide a novel device for controlling the operation of the braking means in response to air pressures created by the movement of the aircraft in flight.

Various other objects, advantages and meritorious features will become more fully apparent from the following specification, appended claims and accompanying drawings wherein:

Figure 1 is a side elevation of an aircraft showing one manner of installing the device of this invention, Figure 2 is a longitudinal vertical sectional view through an instrument embodying the features of this invention, Figure 3 is a front view of the dial of the instrument of Figure 2, Figure 4 is a fragmentary sectional view showing the braking means for controlling the operation of the instrument, Figure 5 is a back view of the instrument showing the control for presetting the braking means for operation at various air pressures, Figure 6 is an enlarged fragmentary sectional view showing the control for setting in operation the indicator for trip time, Figure 7 is a top fragmentary sectional view of the means for operating the set of numbering wheels of the register, Figure 8 is a vertical sectional view of the instrument along line 8—8 of Figure 2, Figure 9 is a view in elevation of the air speed presetting pointer, Figure 10 is a side elevation of the forward part of an aircraft illustrating a modified form of installing the device of this invention, Figure 11 is a side elevation of an instrument partly broken away to illustrate a modification of the invention, Figure 12 is a detail side view of a modified form of diaphragm used in the instrument of Figure 11, Figure 13 is a side elevation of the forward part of an aircraft illustrating a further modification of the invention utilizing sub-atmospheric pressure to control the operation of the indicating device, Figure 14 is a side elevation of a part of instrument used in the modification of Figure 13 partly broken away to show the interior arrangement, and Figure 15 is an enlarged detail view of the means for obtaining sub-atmospheric pressure to control the operation of the device of Figures 13 and 14.

The instrument of this invention may be located in any suitable place on an aircraft and is shown in Figure 1 mounted on the indicating panel board in full view of the pilot. The device in general comprises a small, light weight indicating device 10, which may be mounted as shown in Figure 1 on the instrument board of the aircraft, and means extending to an exposed portion of the aircraft for rendering the device operable by the movement or pressure of the air created when the aircraft is in flight. In the illustrated embodiment of the invention this last means is in the form of a flexible tube shown at 12 in dotted outline leading to a metal tube 14 mounted on the outside of the airplane and opening forwardly thereof to receive air caused by the movement of the aircraft in flight. Preferably the metal tube is mounted so as not to be exposed to the propeller blasts, otherwise if it were it might cause the instrument to operate when the engine was warming up or the aircraft taxiing around.

The instrument itself comprises a circular shell or casing which may be in one part or composed of two telescoping sections as shown. The front section 16 is longer and is closed on the front end by a dial and glass cover shown in Figure 3. The rear section 17 of the casing is shorter and is closed on the back side by a wall 18 having a central aperture therein through which extends the means for rendering the instrument responsive to the movement of the aircraft in flight. The dial is provided with a horizontal slot 20 behind which is mounted a set of number wheels 22 of a register. From right to left the numbers exposed through the slot indicate the minutes, hours, tens of hours, hundreds of hours and thousands of hours of flight time. Above the registering wheels is a scale 24 across which a pointer 26 is adapted to sweep. This scale and pointer means is adapted to indicate the elapse time of one flight of the aircraft and is set into operation manually. This is accomplished by depressing the projecting head of a pin 28. The dial is enclosed in a glass cover and mounted within a circular bracket 30 secured by screws 32 to a corresponding circular flange on the front end of the casing.

The set of number wheels 22 of the odometer are mounted on a horizontal shaft 34 supported behind the slot 20 in the dial face as shown in Figure 7. A train of gears for driving the wheels is indicated at 36, 38, 40, 42 and 44. The last gear wheel 44 is mounted on the end of the shaft 46 extending through an intermediate forward supporting plate 48 to a clock-type of operating mechanism. This clock mechanism is disposed between the plate 48 and an intermediate rearward supporting plate 50. Rods 52 extending longitudinally of the casing secure the two supporting plates in spaced relation to one another. The clock mechanism generally indicated at 54 may be of any suitable type and except for the manner of controlling the operation of the clock mechanism it forms no part of the present invention. For this reason only general reference is made to the parts of the mechanism. The clock mechanism may be either a spring or electrically operated device. It is herein shown as an electrically operated mechanism and the leads 56—56 connected to the mechanism provide the current from a suitable source of electrical current.

As is standard practice, the clock mechanism is provided with an oscillating balance wheel indicated at 58. To control the operation of the clock mechanism, a brake element of novel construction is provided for operating directly against the rim or periphery of the balance wheel. This brake member comprises an elongated flexible inherently resilient metal strip or blade 60 having a jogged free end portion 62 adapted to engage the periphery of the balance wheel and prevent oscillation thereof. The blade extends from the balance wheel over the top of the clock mechanism and downwardly across the rear face of the supporting plate 50. The end opposite to the jogged portion 62 is fixed in any suitable way such as by securement to the plate 50 by the screw 64 which is threaded in the end of the bottom rod 52 and secures the plate thereto. The intermediate portion of the blade extending across the rear face of the plate 50 is outwardly or rearwardly bowed as indicated at 66. The section 68 of the blade beyond the bowed portion and before the blade bends forwardly over the clock mechanism engages the rear face of the plate 50. The blade is so bent throughout its length that normally the jogged end portion 62 yieldingly bears on the periphery of the balance wheel and functions as a brake preventing oscillation thereof and the operation of the clock mechanism.

The free end portion 62 is movable to a position to release the balance wheel for operation and this movement is under control of means responsive to the movement of the aircraft in flight. In the present embodiment of the invention this means comprises an air pressure responsive device including a diaphragm 70 sealed within a diaphragm housing. The latter consists of a forward circular wall 72 and a rearward circular wall 74 having their respective edges brought together in the form of an apex as shown. The rim of the diaphragm is supported at the juncture of the edges of the walls of the housing. The diaphragm is preferably a sensitive flexible metal disc. On the forward side of the diaphragm a pin 76 is secured which extends through an opening in the wall 72 into substantial contact with the bowed section 66 of the braking member 60. Secured to the outer face of the rear wall 74 is an externally threaded boss 78 having an axial passage 80 therethrough communicating with the interior of the diaphragm housing. The boss 78 is provided with a reduced ribbed section 82 over which one end of the flexible tube 12 is removably secured.

It is obvious from the description of the parts so far made that air pressure created by the movement of the plane in flight is conveyed through the tubing 14 and 12 to the rear side of the diaphragm 70. This will cause the latter to bend or flex to the left in Figures 2 and 4. The pin 76 carried thereby, if not already in engagement with the bowed section 66 of the braking member, will engage this section and, as shown in dotted lines in Figure 4, compress the section toward the supporting plate 50. By virtue of the engagement of the section 68 of the braking member with the plate 50, this compressive action will cause the jogged free end portion 62 to lift away from the rim of the balance wheel 58. This brake released position is shown in dotted lines in Figure 4. The clock mechanism which has heretofore been prevented from operation, will now commence to operate. When the aircraft lands the air pressure will fall sufficiently to cause the diaphragm to return to its initial operating position and the braking element will flex back to its original position in engagement with the rim of the balance wheel. During the flight the shaft 46 leading forwardly from the clock mechanism will rotate the numbering wheels 22 through the train of gears previously described. The time of each flight will be added to the sum appearing on the wheels of the odometer and a pilot taking over the aircraft at any time can instantly determine from the plain figures of the odometer the number of hours the aircraft has had in the air.

On many occasions it is desirable to know the elapsed time of a short flight. This is the purpose of the indicating scale and pointer 24 and 26 respectively. As shown in Figure 6, the control pin 28 therefore extends through the dial face 84 and is provided adjacent to the supporting plate 48 with a collar 86 which is adapted to engage a flexible member 88. The latter is secured to the rear side of the plate 48 and is bent to extend around to the front side and normally yieldingly bears upon a gear wheel 90 meshing with the gear 42 as shown in Figure 8. Gear 90 is slidable and freely rotatable on the shaft 92.

The pointer 26 as shown in Figure 6 is bent to extend through an arcuate slot 94 and has its inner end rotatably mounted in the shaft 92. Fixed to the connected end of the pointer 26 is a collar 96 encircling the shaft 92. Between the latter and the gear wheel 90 is a frictional element 98. Normally the flexible member 88 yieldingly urges the gear wheel to the left in Figure 6 as shown by the position of the member in full lines. This frictionally couples the pointer 26 to the gear wheel and the former is swung across the scale 24 as the latter rotates. A light coil spring 100 connected at one end to the pointer and at the other end to a bracket 102 yieldingly urges the pointer to swing in a direction counter to the rotation of the gear wheel 90 but its tension is not equal to the frictional engagement between the collar 96 and the element 98 and normally the spring is ineffective. However, upon depression of the control pin 28, the collar 86 thereon flexes the member 88 rearwardly and releases the frictional engagement between the parts sufficiently to allow the spring 100 to return the pointer to its initial operating position. Thus, when the aircraft takes off both the register and the pointer 26 are set into operation, but the latter can be reset to start again at any time by depression of the control member 28. The register, however, cannot be reset and continues to accumulatively indicate the flight hours and minutes of the aircraft.

The mechanism is provided with novel mechanism for presetting the device to commence operation at any one of several speeds of the aircraft. Take-off speeds of aircraft vary and when the instrument is installed this novel provision can be set to operate the mechanism at the take-off speed of the aircraft. Referring to Figure 5, the rear face of the back wall 18 is provided with a scale 104 indicating various air speeds. A pointer 106 is provided for indicating any one of the speeds and as shown is pointing at the air speed of 40 miles per hour. The pointer is fixed to a collar 108 which encircles the boss 78. The latter as shown in Figures 2 and 5 is provided with a flat side 110. The collar 108 is shaped with a flat side 112 on the inner periphery thereof as shown in Figure 9 which keys with the flat side of the boss so that both the boss and pointer are secured together for joint rotation. A nut 114 is threaded upon the boss and serves to hold the parts in adjusted position.

Since the boss 78 is fixed to the rear wall 74 of the diaphragm housing and is threaded in the back wall 18 of the casing, the relation of the parts of the air speed presetting device is such that rotation of the boss and the diaphragm housing with respect to the casing will advance or retract the diaphragm housing with respect to the bowed section 66 of the brake member 60. The pointer 106 being keyed to the boss will rotate therewith and traverse the scale 104. Advancement or retraction of the diaphragm housing will vary the initial operating position of the pin 76. Upon setting the pointer 106 opposite the air speed at which it is desired the mechanism should commence to operate, the nut 114 may be threaded home to secure the parts in adjusted position. This presetting device is located on the back side of the instrument and is inaccessible once the instrument is installed.

In the embodiment of the invention illustrated in Figures 10 to 12, the instrument is generally the same as that previously described except that in place of the diaphragm housing and metal disc 70 a single flexible rubber disc 120 is utilized. This rubber disc as shown in Figures 11 and 12 is circularly corrugated forming a protuberance on the axis thereof as shown at 122. The disc 120 is supported adjacent the rear end of the instrument with the flat peripheral margin thereof clamped between two ring-shaped members 124 and 126. A resilient metal blade-like member 128 similar to the blade 60 previously described is provided for controlling the operation of the instrument. It is fixed at one end to the back wall 130 of the clock mechanism and the opposite end is bent forward for engagement with a wheel in the clock gear train such as the balance wheel 132. The intermediate portion extending across the back wall 130 is bowed rearwardly as indicated in Figure 11. Between the bowed portion and the forwardly bent portion the blade bears on a fixed part of the instrument such as the back wall 130. Between the bowed portion of the blade and the rubber diaphragm is a centrally apertured wall 134. Rearwardly of the diaphragm is an air inlet tube 136 similar to the boss 78 previously described.

As in the previously described embodiment of the invention, the free end of the blade 128 normally bears on the balance wheel serving as a brake therefor and preventing operation of the clock mechanism. However, when air pressure is created in the tube 136 by the movement of the aircraft in flight the rubber diaphragm flexes inwardly toward the blade and the central protuberance 122 enters the aperture in the plate 134 and presses against the bowed portion of the blade. This pressure as in the previously described embodiment of the invention deforms the bowed portion inwardly as indicated by the dotted lines and the free end of the blade moves free of the balance to allow the clock mechanism to operate.

The tube 136 delivering the air pressure to the instrument communicates with a flexible tube 138 extending to any suitable place on the aircraft such as the bottom of the fuselage below the instrument as indicated in Figure 10. Communicating with the outer end of the flexible tube and projecting from the fuselage is a metal tube 140 bent at a right angle and opening forwardly of the aircraft. It has been found by experiment that the air pressure developed for controlling the operation of the instrument varies appreciably adjacent to the skin of the fuselage. The pressure is progressively greater from the skin outwardly. This variation in pressure is taken advantage of to preset the instrument for operation at the take-off speed of the aircraft. To accomplish this, the tube 140 is adjustably mounted in the fuselage for movement generally perpendicularly thereto. The neck of the tube is externally threaded at its point of entrance into the fuselage. Two nuts 142 and 144 are threaded to the neck of the tube, one inside and the other outside of the fuselage. At the time the device is installed in the aircraft these nuts may be adjusted with respect to one another and the tube to project the latter the desired distance from the skin of the aircraft so that the right amount of pressure is obtained to release the brake 128 when the aircraft leaves the ground. Since aircraft vary in construction and operation, the two nuts may be adjusted at any time to obtain the desired pressure.

Figures 13, 14 and 15 illustrate a modification of the invention wherein suction or sub-atmospheric pressure is utilized to control the operation of the instrument. The latter is generally similar to the embodiment of the invention of Figures 10 to 12. A rubber diaphragm 150 similar to that shown in Figure 12 is used. This diaphragm is mounted in the manner similar to that shown in Figure 11. The central protuberance 152 projects through an aperture in the plate 154 into engagement with the bowed portion of a blade 156 fixed at one end and having the opposite end free. The flexibility of the blade is such that the light pressure of the rubber diaphragm flexes the blade out of the position to which its inherent resiliency tends to move it. The full line position in Figure 14 shows the position of the blade with the protuberance 152 of the diaphragm pressing thereagainst. In this position the free end engages the wheel 158 of the clock gear train and holds it against movement. However, when the rubber diaphragm moves rearwardly away from the blade, the latter assumes the dotted line position in which the free end thereof is clear of the wheel as shown and the latter is permitted to operate.

The tube 160 opens into communication with the side of the diaphragm opposite to the blade. It is connected to a flexible tube 162 extending from the instrument to a suitable surface area of the aircraft such as the bottom of the fuselage below the instrument as shown in Figure 13. At this point the flexible tube is connected to a downwardly extending metal tube 164 which projects from the bottom of the fuselage. This metal tube has its lower opened end cut on a bias so that the opening faces rearwardly as shown. It has been found by experiment that this construction of the tube is sufficient when the aircraft is in flight to create a suction in the tube sections leading to the instrument which will pull the rubber diaphragm away from the blade and allow the latter to assume its brake releasing dotted position. As in the embodiment of Figure 10, it has been found that the extent the tube 164 projects below the fuselage has a direct bearing on the amount of sub-atmospheric pressure developed in the instrument. When close to the skin of the fuselage, the opening of the tube 164 develops less suction. When projected further downwardly a progressively greater suction is developed. This can be taken advantage of as in the previous embodiment to cause the release of the instrument brake when the aircraft attains its take-off speed. To this end, the tube 164 is externally threaded and receives thereon two nuts 166 and 168 on opposite sides of the fuselage's skin which are adjustable as in the previous modification to vary the extent the tube projects below the fuselage.

What I claim is:

1. A meter for indicating flight time of an aircraft comprising, in combination, a visible dial having means for cumulatively indicating on the face thereof the number of flight hours and minutes of an aircraft, a clock mechanism including an oscillatable balance wheel for driving said indicating means, a flexible blade-like member having one end shaped for releasable engagement with the balance wheel to prevent oscillation thereof, a diaphragm enclosed within a housing, means operatively connecting said diaphragm and said member and operable upon movement of the diaphragm in one direction to move the member to a position releasing the balance wheel for oscillation, means for rendering said diaphragm responsive to differential air pressures created by the movement of an aircraft in flight, means mounting said diaphragm for bodily movement toward and away from the member for varying the air speed at which the member will release the balance wheel for operation, and means for indicating the minimum air pressure at which said diaphragm and member are set for releasing the balance wheel.

2. A meter for indicating time of flight of an aircraft comprising, in combination, a visible dial having means for cumulatively indicating on the face thereof the number of flight hours of an aircraft, clock mechanism for driving said indicating means including a movable member, releasable brake means engageable with said member and when so engaged preventing movement thereof and the operation of the clock mechanism, a diaphragm mounted in a housing, means responsive to the movement of said diaphragm in one direction to release said brake means, means for rendering said diaphragm responsive to differential air pressures created by the movement of an aircraft in flight to cause the diaphragm to move in said direction, adjustable means mounting said diaphragm housing for bodily movement to vary the air speed of the aircraft at which said brake means releases said movable member, and a pointer responsive to the adjustment of said last means cooperating with a scale for indicating the air speed of the aircraft at which said brake releasing means become operative.

3. An instrument for indicating flight time of an aircraft including, in combination, a casing containing means for cumulatively indicating the flight time of an aircraft and a diaphragm responsive to differential air pressures created by the movement of the aircraft in flight, means extending to the outside of the casing for bodily moving the diaphragm in the casing to render the same effective at different air speeds, and means responsive to the bodily adjustment of the diaphragm for indicating outside of the casing the air speed of the aircraft at which the diaphragm becomes effective.

4. In a meter for indicating operating periods of time including a visible dial having means for cumulatively indicating operating time and further including a clock mechanism for driving the indicating means having a movable element whose movement is necessary for the operation of the clock mechanism, a flexible blade-like control member fixed at one end and having the opposite end free and releasably engageable with said element to stop its movement and the operation of the clock mechanism, a disc-shaped diaphragm of flexible material, said diaphragm being concentrically circularly corrugated and having the central corrugation thereof forming a protuberance projecting from one side of the diaphragm, means mounting said diaphragm with the central protuberance thereof directed toward an intermediate portion of the control member for engagement therewith, and means rendering said diaphragm responsive to differential pressures to cause the diaphragm to flex and move the central protuberance thereof into engagement with the control member to shift the free end of the latter into engagement with said movable element of the clock mechanism.

5. In a meter for indicating operating periods of time including a visible dial having means for cumulatively indicating operating time and further including a clock mechanism for driving said indicating means having a movable element whose movement is necessary for the operation of the clock mechanism, a wall in the meter having an aperture therethrough, a flexible blade-like control member fixed at one end and having the opposite end free and contactably engageable with said element to prevent the movement thereof and the operation of the clock mechanism, said control member having an intermediate portion thereof disposed immediately adjacent to the aperture in said wall, a disc-shaped diaphragm of flexible material having concentrically disposed circular corrugations around the axis of the diaphragm and further having the central corrugation thereof forming a protuberance projecting from one side of the diaphragm, means mounting said diaphragm adjacent to the side of the wall opposite to said control member with the central protuberance thereof directed toward the aperture of the wall, and means rendering said diaphragm responsive to differential pressures to cause the diaphragm to move the central protuberance thereof through said aperture and into engagement with the control member for shifting the free end thereof either into or out of engagement with the movable element of the clock mechanism.

6. In an instrument for indicating flight time of an aircraft, a register for cumulatively indicating the flight time of an aircraft, clock mechanism for driving the register including a movable member whose movement is necessary for the operation of the clock mechanism, a flexible diaphragm responsive to differential air pressures created by the movement of the aircraft, means responsive to the flexure of the diaphragm and operable when the diaphragm is flexed in one direction to engage said member and stop its movement and the operation of the clock mechanism and when the diaphragm is flexed in the opposite direction to permit the movement of the member and the operation of the clock mechanism, means for regulating the operation of the diaphragm to vary the effective pressure at which the diaphragm will stop the movement of said member, and means associated with said regulating means for indicating the speed of the aircraft at which the diaphragm is regulated for stopping the movement of said member.

GEORGE M. FREEMAN.

REFERENCES CITED

The following references are of record in the file of this patent:

UNITED STATES PATENTS

| Number | Name | Date |
|---|---|---|
| 1,351,538 | Reynolds | Aug. 31, 1920 |
| 1,415,004 | Watson | May 2, 1922 |
| 1,446,613 | Bush | Feb. 27, 1923 |
| 1,557,721 | Passamaneck et al. | Oct. 20, 1925 |
| 1,967,157 | Thornton-Norris | July 17, 1934 |
| 2,006,682 | Mayers | July 2, 1935 |
| 2,246,510 | Diehl | June 24, 1941 |
| 2,325,312 | Follender | July 27, 1943 |

FOREIGN PATENTS

| Number | Country | Date |
|---|---|---|
| 649,933 | France | Aug. 4, 1927 |